United States Patent [19]
Rissler

[11] Patent Number: 5,997,222
[45] Date of Patent: Dec. 7, 1999

[54] EXTERNALLY INDEXING COUNTERSINK PILOT GUIDE

[75] Inventor: Lawrence D. Rissler, Sumner, Wash.

[73] Assignee: The Boeing Company, Seattle, Wash.

[21] Appl. No.: 09/183,629

[22] Filed: Oct. 30, 1998

[51] Int. Cl.[6] .............................. B23B 51/10; B23B 49/00
[52] U.S. Cl. .............................. 408/82; 408/201; 408/225
[58] Field of Search .................................. 408/201, 80–83, 408/83.5, 196, 209, 225

[56] References Cited

U.S. PATENT DOCUMENTS

| | | | |
|---|---|---|---|
| 2,418,790 | 4/1947 | Peckham, Jr. | 408/201 |
| 2,665,597 | 1/1954 | Hill | 408/82 |

Primary Examiner—Steven C. Bishop
Attorney, Agent, or Firm—Lawrence W. Nelson; Bernard A. Donahue

[57] ABSTRACT

This invention is a countersink, counterbore or spotface, external pilot guide 98 which aligns a countersink cutter's edges 170, 171 and 172 into the center of a pre-drilled hole 15. The pilot guide indexes and attaches by lock down screw 165 to the countersink cutter 18 external body hole 160, three pilot legs 100 are recessed into the countersink cutter 18's flute pockets 150 and allows the cutting edges 170, 171 and 172 to extend through the pilot countersink cut-outs 140. Button nose 110 outside diameter comes in a range of sizes dependent on the pre-drilled hole 15 size (example: Pre-drilled hole size 0.375", button nose size 0.372") this allows clearance for friction expansion. All button nose 110 outside diameter's fit the same countersink cutter 18 and all have a hole in the center which allows the flare tube shaft 14 to move freely during the countersinking operation.

5 Claims, 4 Drawing Sheets

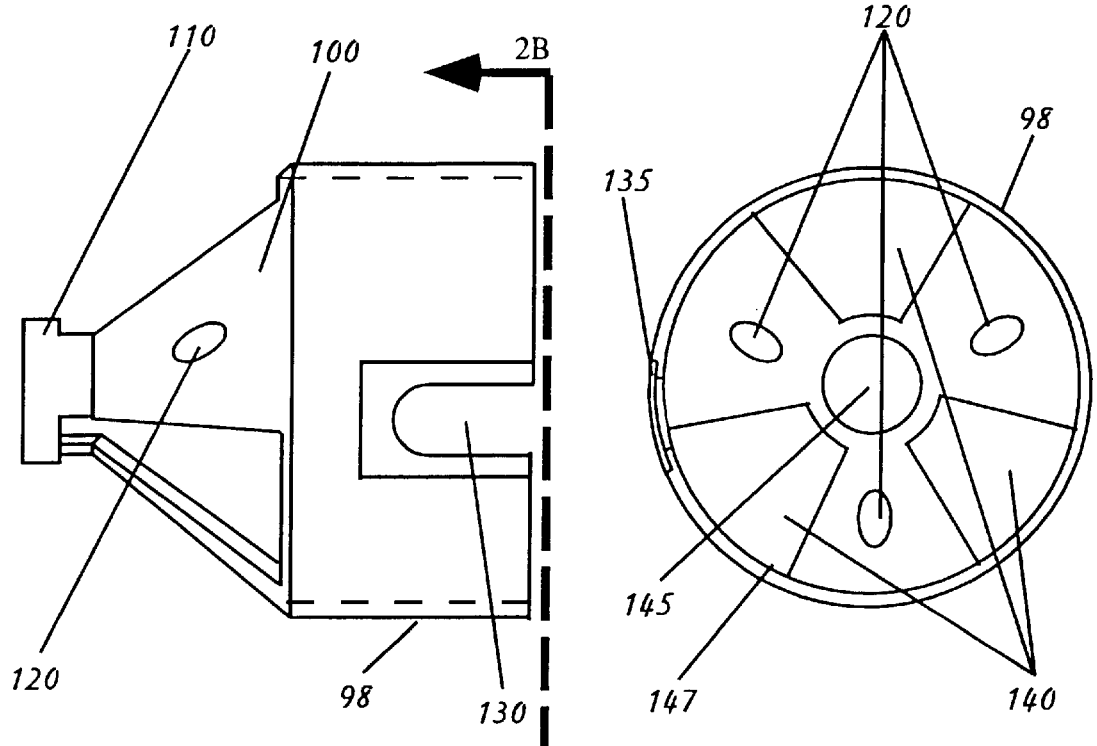
FIG 2 A
FIG 2 B
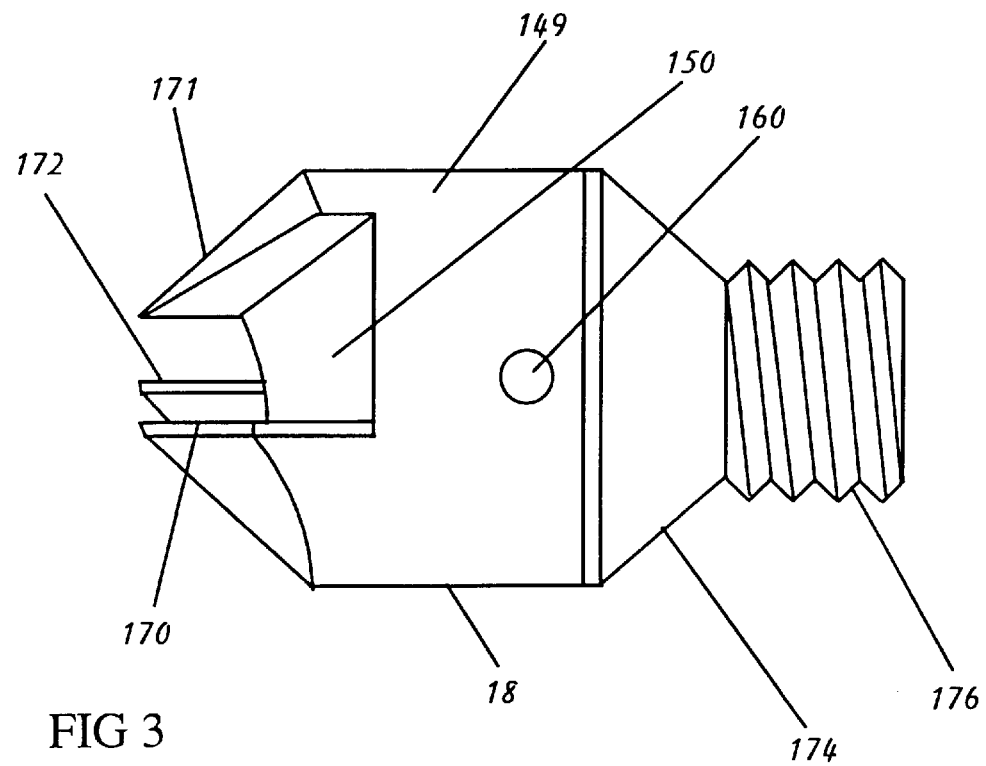
FIG 3

EXTERNALLY INDEXING COUNTERSINK PILOT GUIDE

FIELD OF THE INVENTION

The present invention relates to an apparatus and method for centering and alignment of cutter operations in countersinking, counterboring, or spotfacing (hereinafter countersinking) of holes in metal or composite materials.

BACKGROUND INFORMATION

The present standard method of countersinking large diameter holes in aircraft manufacturing operations is a highly regulated operation. Very close tolerances are held with countersink fastener hole diameters, surface perpendicularity, surface flushness, and surface angularity to hole. Therefore it is necessary to maintain a proper attitude of a countersink with respect to all of these measurements and tolerances. Repairing a mis-aligned countersink requires a larger size hole, larger countersink and a larger fastener to be installed. This adds time, cost, and weight to the manufactured product. The tolerances for workpiece surface flushness of 100 degree countersink fasteners may be –0.005 to +0.002 inches. Pre-drilled hole angularity must be held within 2 degrees because of aerodynamic flushness considerations.

U.S. patent application Ser. No. 08/788,727 is entitled "Blind Hole Self-Collet Countersink" and is hereby incorporated by reference in its entirety into this patent application. For convenience, this patent application Ser. No. 08/788,727 will hereinafter be referred to as the '727 system. L. D. Rissler is the sole inventor of the '727 system. Rissler is also the sole inventor of the invention described in this patent application. The '727 system attaches to a pre-drilled hole and countersinks perpendicular to the front side material or workpiece surface. The '727 system is fully automatic, but it lacks an improved externally indexing countersink pilot guide apparatus, hereinafter "external pilot guide", of this invention and is therefore dependent on a conventional countersink grind configuration to center the countersink cutter. Conventional countersink operations use an internal countersink pilot, which indexes to the center bore of the countersink. The internal countersink pilot allows no means for a hole large enough to accommodate the flare tube 14 '727. The unique external pilot guide of this invention substantially improves the performance of the '727 system and other systems of countersinking, counterboring, or spotfacing.

SUMMARY OF THE INVENTION

Accordingly, countersinking holes in today's close tolerance environment is a labor intensive and time consuming process. The operation needs to be precise and accurate the first time. Normally there is no second chance for corrections, other than expensive rework. At the increased rates in today's manufacturing, the aircraft industry needs a foolproof method of producing countersunk holes that do not exceed design tolerances.

Applicant's invention provides an accurate means for centering a countersink cutter in a pre-drilled hole. Means are provided for preventing a single cutting edge from taking a greater depth of cut in the material than other associated integrally connected cutting edges.

Other aspects of this invention that are unique and valuable include the following: A countersink cutter with a hole through the center is modified by grinding the flute pockets in a deeper and wider configuration to accommodate pilot guide legs. The external body diameter of countersink cutter is held to a very close tolerance grind. The pilot guide internal surface bore 147 is ground to a close 0.0004"–0.0006" tolerance for indexing to the countersink's external surface 149.

All aspects of the external countersink pilot guide are manufactured on a center to center point to maintain concentricity. A special cutter external pilot guide extraction wrench is provided to remove and install the pilot guide and countersink cutter.

Another aspect of this invention is a means for stabilizing and preventing the cutter from shifting in a hole and creating an oblong countersink surface.

Still another aspect of this invention is that of providing a means for maintaining the centerline of a hole while the countersink is being cut. Also, means are provided to prevent the cutter from following a hole's angularity during cutting, a countersink cutter is held perpendicular to the work piece, not perpendicular to the pre-drilled hole, thereby producing better alignment no matter what the angularity of the pre-drilled hole is.

BRIEF DESCRIPTION OF THE DRAWINGS

FIGS. 2A, and 2B are a side and an end view showing the externally indexing countersink pilot guide of this invention.

FIG. 3 is a side view of the improved countersink cutter of this invention.

DETAILED DESCRIPTION OF A PREFERRED EMBODIMENT

Figure 1:
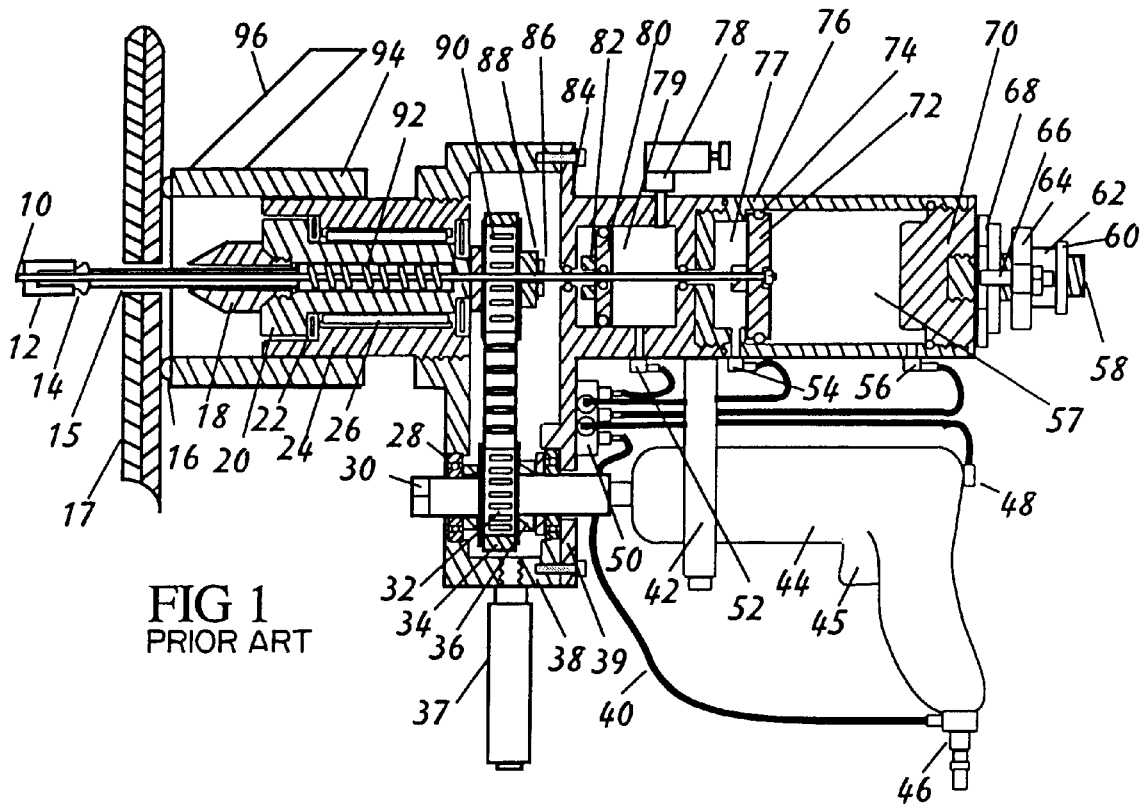
FIG. 1 is a sectional side view showing the '727 system at the beginning of a countersinking operation.

The foregoing aspects and many of the attendant advantages of the invention will become more readily appreciated as the same becomes better understood by reference to the following detailed description when taken in conjunction with the accompanying drawings.

FIG. 2A is an end view of the unique externally indexing countersink pilot guide 98, which has been machined of one piece of tool steel material. Collectively, FIGS. 2A and 2B show an integrally formed pilot leg 100, a button nose 110, extraction removal holes 120, and a pilot lock down flat cut out 130. A lock down screw flat 135 is shown in end view FIG. 2B, and three pilot countersink cutouts 140 and a button nose through hole 145.

FIG. 3 shows the countersink cutter 18 to include enlarged countersink flute pockets 150, a lock down screw hole 160, countersink cutting edges 170, 171 and 172, a conical surface 174 and attachment threads 176.

Figure 5:
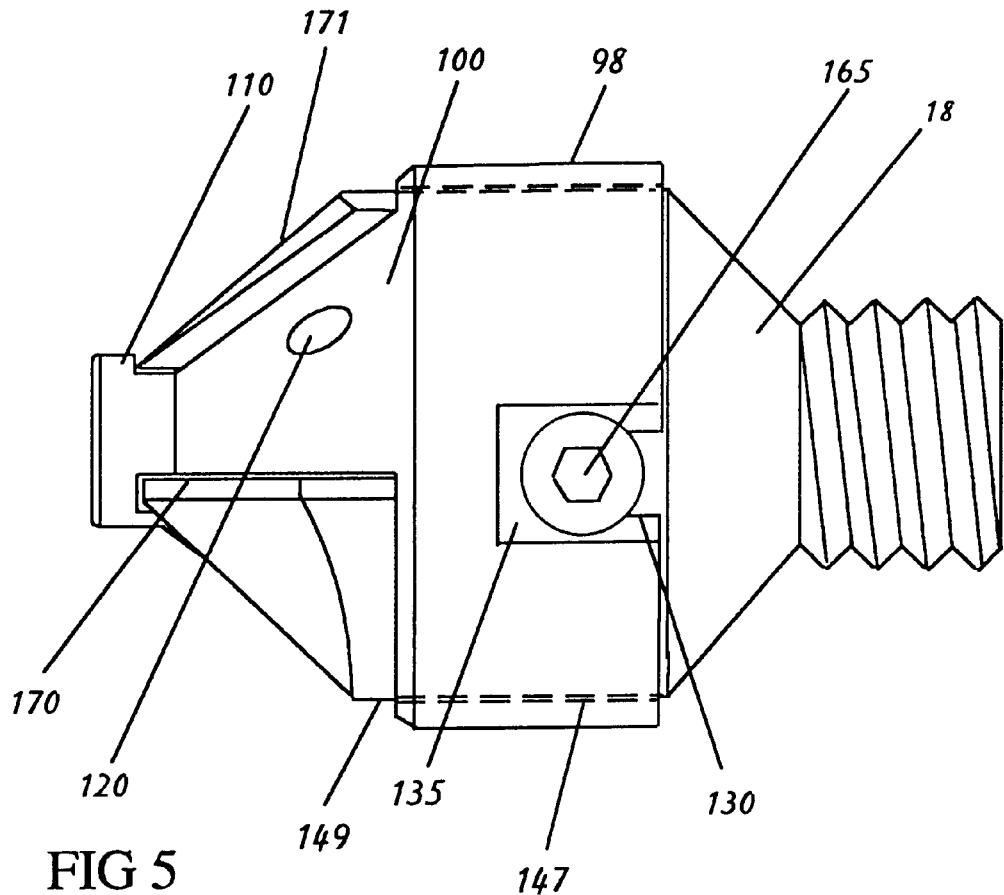
FIG. 5 is a side view showing the external pilot guide assembled on to the improved countersink cutter.

FIG. 5 shows an externally indexing countersink pilot guide 98 with the pilot leg 100, the button nose 110, an extraction removal hole 120, a pilot lock down cutout 130, a lock down screw flat 135, a countersink cutter 18, a lock down screw 165, and countersink cutting edges 170 and 171.

Figure 6:
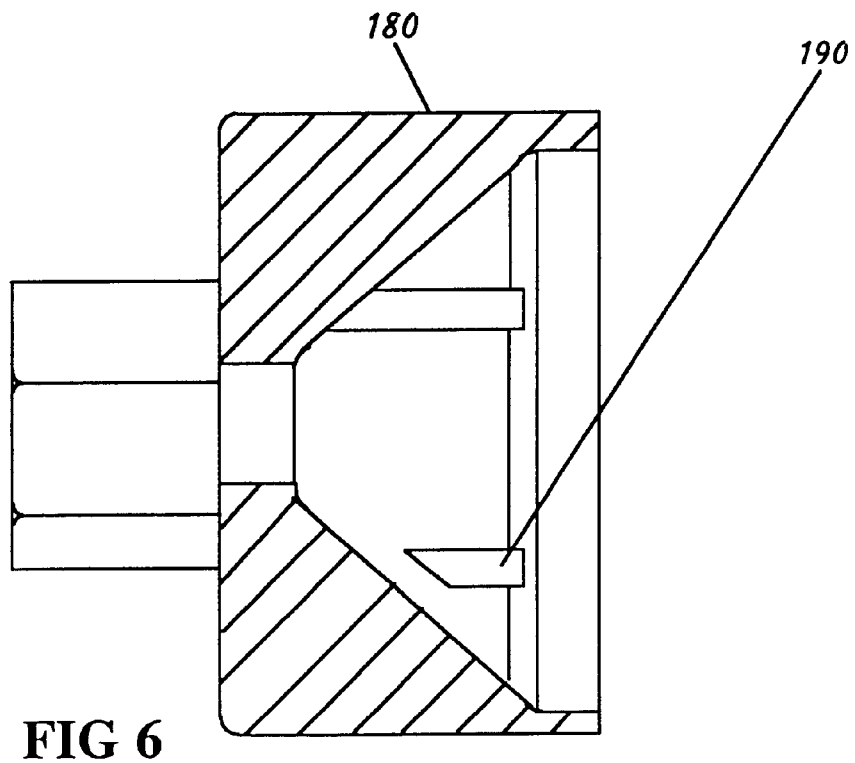
FIG. 6 is a sectional exploded side view showing the cutter removal wrench.
Figure 7:
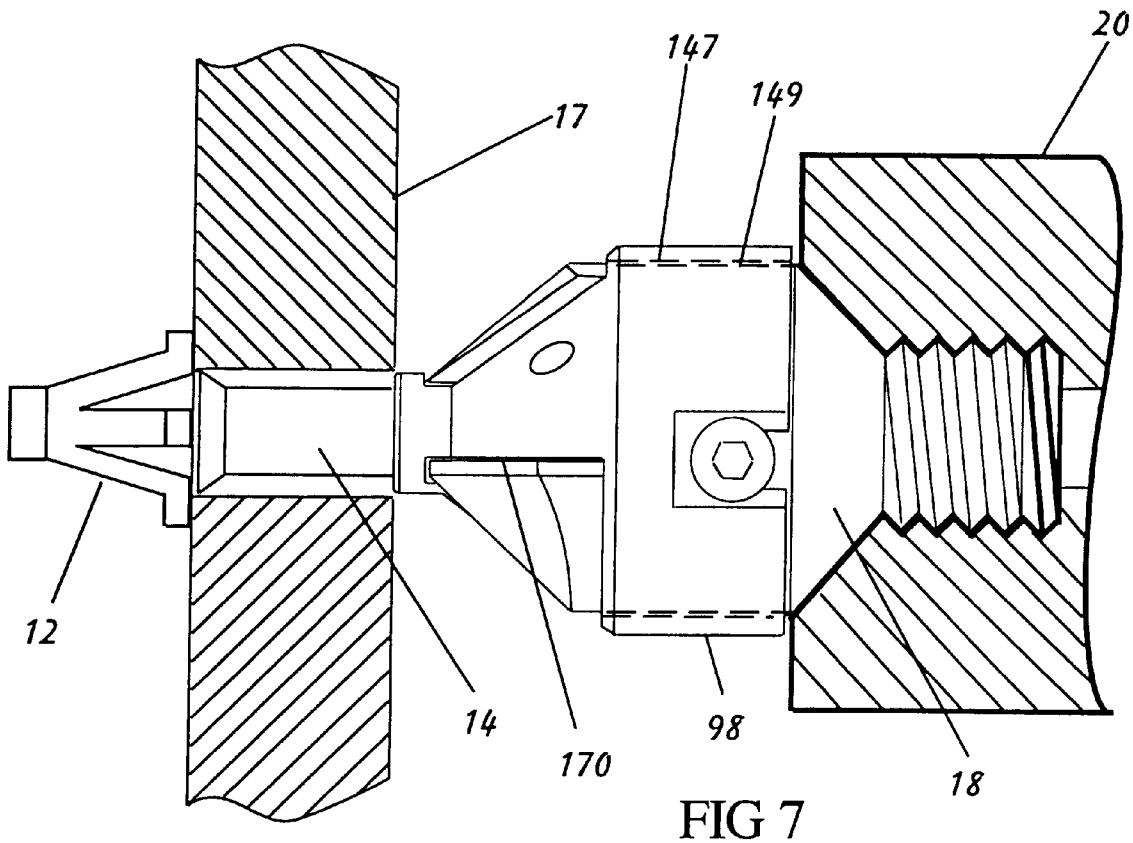
FIG. 7 is a sectional exploded view showing the external countersink pilot guide attached to the countersink cutter 18 and tool spindle 20 of the '727, before entering material 17.
Figure 8:
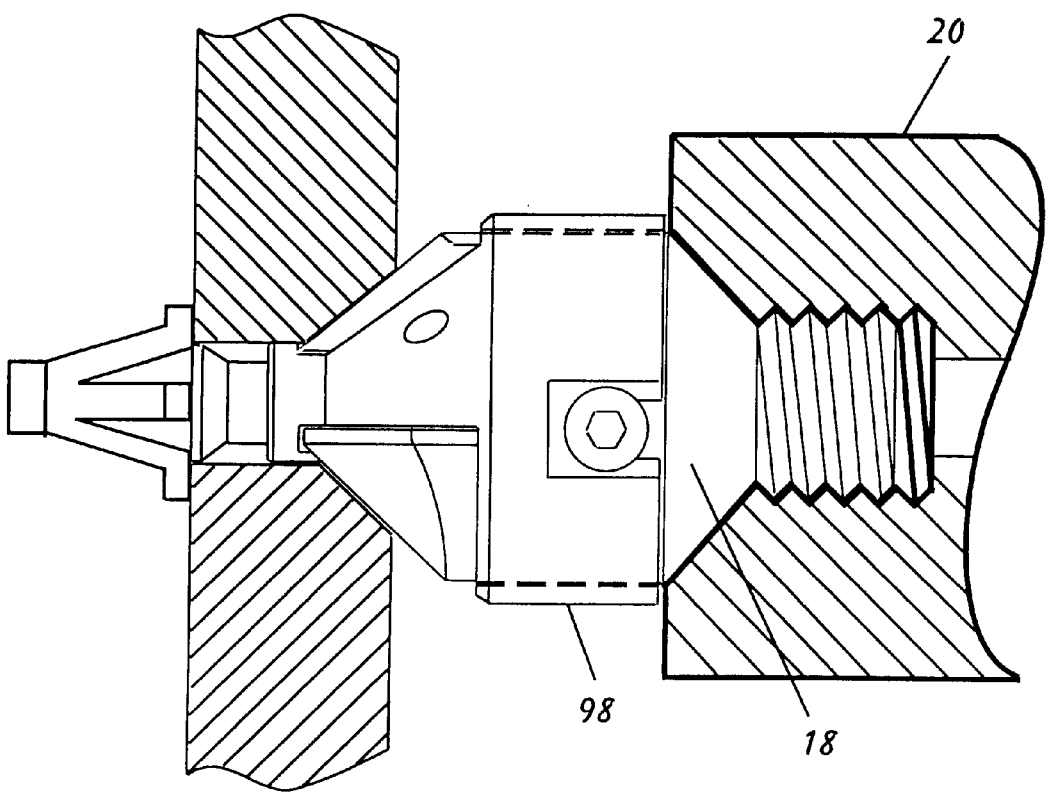
FIG. 8 is a sectional exploded view showing the external countersink pilot guide attached to the countersink cutter 18 and tool spindle 20 of the '727, after entering material 17 and the ability to center the cutter 18 within the material hole 15.

FIG. 6 shows a pilot guide extraction wrench 180, which is needed to quickly disassemble the countersink pilot guide 98 of this invention, particularly after high torque loads have been applied. Wrench pins 190, all three of which are shown, index with the pilot guide extraction removal holes 120 (only one of three are shown). This allows wrench flats 200 to be rotated by a conventional tool such as a wrench acting on the flats 200.

This externally indexing countersink pilot guide 98 is machined from a single piece of material such a tool steel to maintain perpendicularity and surface alignment.

Referring to FIGS. 2A, 2B and 3 the external pilot guide 98 has been machined from a solid piece of material. To help define the invention, the integral machined surfaces have been given feature numbers. All internal and external surfaces are machined before the external pilot guide countersink cut-outs 140, and the lock down screw cut-out 130 are machined in a configuration which coincides with the countersink cutting edges 170, 171 and 172 and lock down screw 160.

Referring to FIGS. 2A, 2B and 3, a countersink cutter is modified by grinding the flute pockets 150 deeper and larger to allow the pilot legs 100 to recess below the countersink cutting edges 170, 171, and 172. This allows the countersink cutting edges 170, 171 and 172 to protrude through the pilot countersink cut-outs 140 when the external pilot guide 98 is installed on the countersink cutter 18. A button nose through hole 145 is to give clearance for the flare tube shaft 14 (see FIG. 1) of the '727 system.

Referring to FIG. 5, assembly of the external pilot guide 98 on to the countersink cutter 18 shows the countersink cutting edges 170 and 171 protruding a predetermined amount beyond the external surface of pilot leg 100, when the external pilot guide 98 is slipped on to the countersink cutter 18, which is a precisely ground external body. When the pilot guide 98 is properly placed, lock down screw 160 is tightened on to the lock down screw flats 135. This secures the external pilot guide 98 on to the countersink cutter 18.

Figure 4:
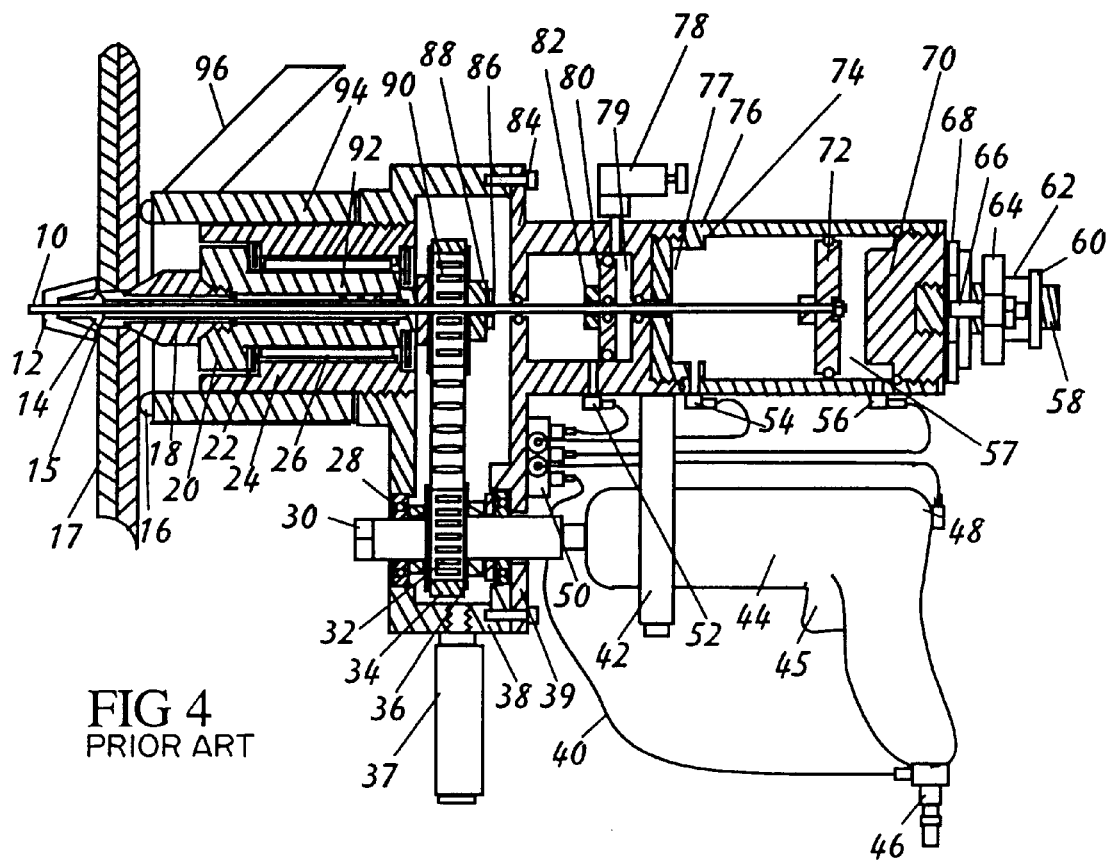
FIG. 4 is a side sectional view showing the '727 system countersink engaged in the workpiece.

Referring to FIGS. 1, 4, and 5, the pilot guide 98 assembled with countersink cutter 18 is now installed in the '727 tool spindle 20 and secured by threads. When the blind hole self-collet countersink tool system '727 is operated, the pilot guide 98 centers the countersink cutting edges 170, 171 and 172 with respect to the centerline of the pre-drilled material hole 15. This allows all countersink cutting edges 170, 171 and 172 to cut the material in equal chip loads (amount of material thickness cut in a singular rotation). This alignment feature of the invention maintains material surface 17 concentricity of the countersink cutter 18 with the centerline of the hole. The angularity of the hole has little or no influence on the countersink cutter.

As seen in FIG. 6, the pilot guide extraction wrench pins 190 index with the pilot guide extraction removal holes 120 and allow the removal of the pilot guide 98 and countersink cutter 18 from the '727 Spindle 20.

What is claimed is:

1. Apparatus for guiding a countersink cutter 18 for modifying pre-drilled holes in composite or metal plate material 17, said apparatus comprising:

a) means for centering the countersink cutter 18 in a pre-drilled hole 15 by a button nose 110 which is an integral part of a pilot guide 98, wherein the countersink cutter 18 is modified to accept legs 100 of the pilot guide 98 by grinding cutter flutes 150 of the countersink cutter 18 wider and deeper;

b) at least one cutting edge means (170, 171, 172) integrally connected to said countersink cutter 18;

c) means for stabilizing (110 and 98) the countersink cutter 18 to prevent the countersink cutter 18 from shifting in the pre-drilled hole 15 which can result in an unsatisfactory oblong countersink surface; and d) means for maintaining the centerline of the pre-drilled hole 15 relative to the countersink cutter depth while preventing the countersink cutter 18 from following the angularity of the pre-drilled hole in relationship to a surface of the material 17.

2. The apparatus of claim 1 wherein the apparatus includes a plurality of cutting edge means for preventing a cutting edge from cutting substantially greater depth of cut in the material 17 than the other associated integrally connected cutting edges (170, 171, 172).

3. The apparatus of claim 2 wherein the countersink cutter 18 has a large hole through its center to accommodate a moving flare tube 14 which is pulled into the back side of the pre-drilled hole 15.

4. The apparatus of claim 1 wherein a countersinking operation is held to within a precise location by indexing a rotating cutter guide into a close tolerance hole.

5. The apparatus of claim 1 wherein the apparatus assures that a countersunk pre-drilled hole 15 is perpendicular to the surface of the material surface 17, and wherein the pilot guide 98 insures consistency to the centerline of the pre-drilled hole 15 but is not influenced by angularity of the pre-drilled hole 15.

* * * * *